United States Patent
Feng et al.

(10) Patent No.: US 10,617,257 B2
(45) Date of Patent: Apr. 14, 2020

(54) GRILL ASSEMBLIES AND INTERCHANGEABLE REMOVABLE UNITS FOR GRILL ASSEMBLIES

(71) Applicant: Phase 2, LLC, St. Louis, MO (US)

(72) Inventors: Fu Du Feng, Taipei (TW); Jon Scott Walters, St. Louis, MO (US)

(73) Assignee: Phase 2, LLC, St. Louis, MO (US)

( * ) Notice: Subject to any disclaimer, the term of this patent is extended or adjusted under 35 U.S.C. 154(b) by 509 days.

(21) Appl. No.: 14/920,028

(22) Filed: Oct. 22, 2015

(65) Prior Publication Data

US 2016/0255998 A1    Sep. 8, 2016

(30) Foreign Application Priority Data

Mar. 6, 2015  (CN) .......................... 2015 1 0101472

(51) Int. Cl.
| | |
|---|---|
| A47J 37/07 | (2006.01) |
| F24C 3/08 | (2006.01) |
| F24C 3/10 | (2006.01) |
| F24C 3/02 | (2006.01) |

(52) U.S. Cl.
CPC ....... *A47J 37/0713* (2013.01); *A47J 37/0704* (2013.01); *F24C 3/022* (2013.01); *F24C 3/082* (2013.01); *F24C 3/10* (2013.01)

(58) Field of Classification Search
CPC ... A47J 37/0713; A47J 37/0704; F24C 3/082; F24C 3/10; F24C 3/022
See application file for complete search history.

(56) References Cited

U.S. PATENT DOCUMENTS

| | | | |
|---|---|---|---|
| 2,147,225 A | * | 2/1939 | Williams ................ F23D 91/02 431/155 |
| 2,408,921 A | | 10/1946 | Esson |
| 3,556,078 A | | 1/1971 | McGaughey |
| 3,753,431 A | * | 8/1973 | Koziol ................ A47J 37/0713 126/38 |
| 3,765,397 A | | 10/1973 | Henderson |

(Continued)

FOREIGN PATENT DOCUMENTS

| | | |
|---|---|---|
| EP | 1479331 | 11/2004 |
| WO | WO-9624280 A1 | 8/1996 |

OTHER PUBLICATIONS

Krosaki Harima: Refractories business: "What is a refractory material?": <http://web.archive.org/web/20100127031146/http://www.krosaki.co.jp/en-glish/c4/c.sub.--4.sub.--1.html>. Accessed Mar. 6, 2014.

(Continued)

*Primary Examiner* — Alfred Basichas
(74) *Attorney, Agent, or Firm* — Stinson LLP

(57) ABSTRACT

An apparatus for supplying gaseous fuel to a kamado-style grill is disclosed. The kamado-style grill includes a vessel and a fire bowl positioned within the vessel. The vessel and the fire bowl each have an opening. The apparatus includes a gas burner insertable through the opening of the vessel for positioning below the opening of the fire bowl, and a housing substantially covering the opening of the vessel and including one or more openings for allowing air to pass into or out of the kamado-style grill. Other example apparatuses and grill assemblies for receiving the apparatuses are also disclosed.

32 Claims, 9 Drawing Sheets

(56) References Cited

U.S. PATENT DOCUMENTS

| | | | |
|---|---|---|---|
| 4,321,857 A * | 3/1982 | Best | A47J 37/06 126/39 C |
| 4,510,916 A | 4/1985 | Ogden | |
| 4,607,609 A | 8/1986 | Keating | |
| 4,809,671 A | 3/1989 | Vallejo, Jr. | |
| 5,086,753 A | 2/1992 | Berger | |
| 5,094,221 A | 3/1992 | Ho | |
| 5,190,027 A | 3/1993 | Miceli | |
| 5,588,420 A | 12/1996 | Dickson | |
| 5,617,840 A | 4/1997 | Clifford | |
| 5,676,049 A | 10/1997 | Arnold | |
| 6,000,389 A * | 12/1999 | Alpert | A47J 37/0713 126/25 R |
| 6,827,076 B2 | 12/2004 | Crawford et al. | |
| 7,703,450 B2 * | 4/2010 | Brunner | A47J 37/0713 126/25 A |
| 9,237,828 B2 | 1/2016 | Walters et al. | |
| 2004/0123857 A1 | 7/2004 | Viraldo | |
| 2007/0047166 A1 | 3/2007 | Creel | |
| 2008/0227044 A1 | 9/2008 | Cookson et al. | |
| 2009/0308373 A1 | 12/2009 | Scott et al. | |
| 2011/0283990 A1 | 11/2011 | Walters et al. | |
| 2015/0034066 A1 | 2/2015 | Plott | |

OTHER PUBLICATIONS

Mechanical Metals: "Refractory Anchors and Other Metal Refractory Products": <http://www.mechanicalmetals.com/anchors-insulation/>. Accessed Mar. 6, 2014.

"Calibration". In Chambers 21st Century Dictionary, edited by Mairi Robinson and George Davidson. London: Chambers Harrap, 2001. <http://search.credoreference.com/content/entry/chambdict/calibration/- 0> (Accessed Oct. 8, 2014).

"Kamado". <http.//en.wikipedia.org/wiki/Kamado>. Sep. 6, 2009. Accessed via <http://web.archive.org/web/20090906220951/http:en.wikipedia.org/wiki/- Kamado> (Accessed Oct. 8, 2014).

"Kamado Stainless Steel Gas Burner System"; Kamado Corporation; <http://www.kamado.com/gas.htm>; Accessed May 1, 2006; 8 pages.

\* cited by examiner

GRILL ASSEMBLIES AND INTERCHANGEABLE REMOVABLE UNITS FOR GRILL ASSEMBLIES

CROSS-REFERENCE TO RELATED APPLICATION

This application claims the benefit and priority of Chinese Patent Application No. 201510101472.0 filed Mar. 6, 2015. The entire disclosure of the above application is incorporated herein by reference.

FIELD

The present disclosure relates to grill assemblies and interchangeable removable units for grill assemblies.

BACKGROUND

This section provides background information related to the present disclosure which is not necessarily prior art.

Grills include different components for cooking various types of food. For example, gas grills include gas burners to cook food. In some gas grills, the gas burner may be at least partially removed from the grill to ignite the gas. Charcoal grills such as steel charcoal grills and kamado-style grills utilize charcoal without need for gas to cook food. In some charcoal grills, a removable ash collector may be positioned in the grill to collect ash from the charcoal.

SUMMARY

This section provides a general summary of the disclosure, and is not a comprehensive disclosure of its full scope or all of its features.

According to one aspect of the present disclosure, a grill assembly generally includes a vessel having an opening extending between an interior of the vessel and an exterior of the vessel, a fire bowl removably positioned within the vessel and including an opening extending between an interior of the fire bowl and an exterior of the fire bowl and a first removable unit insertable through the opening of the vessel for positioning below the opening of the fire bowl. The first removable unit includes a gas burner configured to align with the opening of the fire bowl when the first removable unit is inserted in the opening of the vessel. The opening of the vessel is configured to receive the first removable unit and a second removable unit when the first removable unit is removed from the vessel. The grill assembly is configured to operate as a gas fired grill when the first removable unit is inserted in the opening of the vessel and a charcoal fired grill when the second removable unit is inserted in the opening of the vessel. The grill assembly is a kamado-style grill.

According to another aspect of the present disclosure, an apparatus for supplying gaseous fuel to a kamado-style grill is disclosed. The kamado-style grill includes a vessel and a fire bowl positioned within the vessel. The vessel and the fire bowl each have an opening. The apparatus includes a gas burner insertable through the opening of the vessel for positioning below the opening of the fire bowl, and a housing substantially covering the opening of the vessel and including one or more openings for allowing air to pass into or out of the kamado-style grill.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
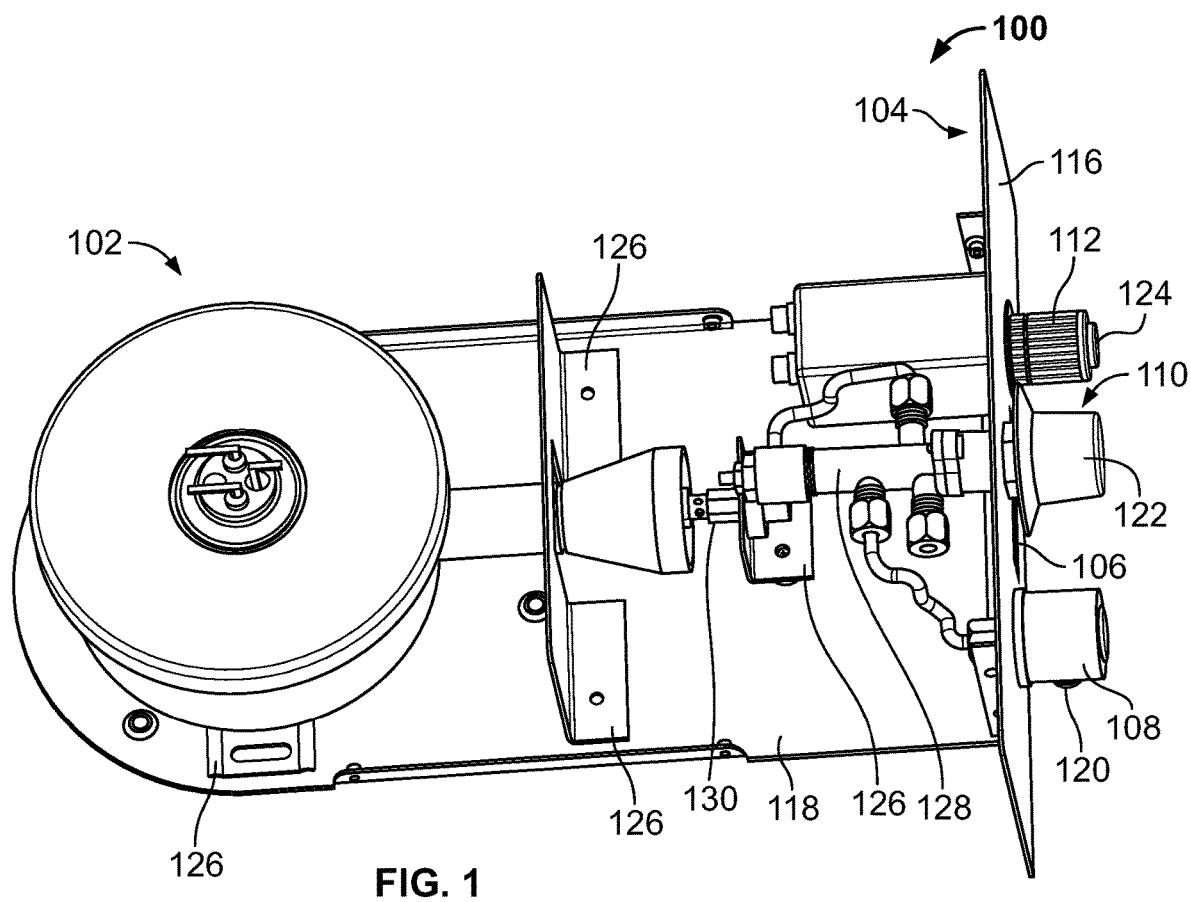
FIG. 1 is a perspective view of a removable gas unit insertable through an opening of a grill according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An apparatus for supplying gaseous fuel to a kamado-style grill according to one example embodiment of the present disclosure is illustrated in FIG. 1 and indicated generally by reference number 100. As further explained below, the kamado-style grill includes a vessel having an opening, and a fire bowl positioned within the vessel and have an opening. As shown in FIG. 1, the apparatus 100 includes a gas burner 102 insertable through the vessel opening for positioning below the fire bowl opening, and a housing 104 substantially covering the vessel opening and including one or more openings 106 for allowing air to pass into or out of the kamado-style grill (not shown in FIG. 1).

For example, the apparatus 100 (e.g., sometimes referred to as a removable apparatus, a removable unit, a removable gas unit, etc.) may be inserted into the vessel opening of the kamado-style grill to allow the grill to operate as a gas fired grill. After which, the apparatus 100 may be removed from the grill, and another apparatus may be inserted in the same vessel opening, the vessel opening may be left open, etc. In such examples, the kamado-style grill may operate as a charcoal fired grill. As such, the apparatus's may be interchangeable such that the grill may operate as a gas fired grill and/or a charcoal fired grill depending on, for example, which removable apparatus is employed.

By employing one or more removable units (e.g., the units disclosed herein including the apparatus 100 of FIG. 1), users may quickly convert a kamado-style grill between a gas fired grill and a charcoal fired grill. Additionally, this conversion between grill configurations may be accomplished with ease as the removable units may slide into and out of the grill without structural modifications to the grill. As such, users may use one grill for gas and/or charcoal instead of multiple grills. For example, gas fired grills may be easier to start, control heat, clean, etc., may require less preparation time (e.g., precooking time, post cooking time such as cool down time, etc.), etc. than charcoal fired grills. As such, users may, for example, employ the gas fired grill configurations disclosed herein on a weekday when users typically have less available time and the charcoal fired grill configurations disclosed herein on a weekend when users typically have additional available time.

As shown in FIG. 1, the removable gas unit 100 may include various components. For example, and as further explained below, the removable gas unit 100 may include the gas burner 102, the housing 104, various vents (e.g., openings 106, etc.), a gas port system 108 for receiving a gaseous fuel, a gas control system 110, an ignition system 112, etc. Although FIG. 1 illustrates each of the various components, it should apparent to those skilled in the art that one or more of the various components may be optional features. Thus, the unit 100 may include only one of the various optional features, two or more of the optional features, etc. For example, in some embodiments, the unit 100 may include the gas burner 102 and the housing 104 with openings 106 for allowing air to pass into or out of the kamado-style grill without the gas port system 108, the gas control system 110, the ignition system 112, etc. In other embodiments, the unit 100 may include the gas burner 102 and the gas control system 110 without the gas port system 108 and the ignition system 112.

The housing 104 may include various components. For example, the housing 104 of FIG. 1 includes a faceplate 116 and a base support 118 extending from the faceplate 116. In other embodiments, and as further explained below, the housing 104 may include walls extending from the faceplate 116 and/or coupled to the base support 118 for enclosing various conduits, etc. of the unit 100. Alternatively, the housing 104 may include any other suitable component in addition to or in place of the faceplate 116 and/or the base support 118.

In the embodiment of FIG. 1, the base support 118 may support the gas burner 102 and the conduits of the unit 100 via one or more structural supports 126 such as brackets, etc. Additionally, the base support 118 may slide and/or rest against structure of the grill when the unit 100 is being inserted and/or inserted into the vessel opening (not shown). Thus, the unit 100 may be supported by the grill during these times.

Additionally, the housing 104 may support various components. For example, and as shown in FIG. 1, the gas port system 108, the gas control system 110, the ignition system 112, etc. may be positioned on the exterior side (e.g., relative to the grill) of the faceplate 116 of the housing 104. As such, these various optional features may be easily accessible to users. Although the gas port system 108, the gas control system 110 and the ignition system 112 are positioned in a particular location and order on the faceplate 116, it should be apparent that the gas port system 108, the gas control system 110 and/or the ignition system 112 may be positioned in any suitable location on the faceplate 116, separate from the faceplate 116, etc. In some embodiments, the gas port system 108, the gas control system 110 and/or the ignition system 112 may be positioned on other portions of the unit 100, separate from the unit 100, etc.

As shown in FIG. 1, the gas port system 108 includes an input port 120 for receiving gaseous fuel. This port 120 may be shaped, sized, etc. to mate with conventional propane sources, natural gas sources, etc. For example, the input port 120 may be a conventional coupling for attaching the gaseous fuel source via a hose or the like. Although not shown, the gas port system 108 may include a shutoff valve (e.g., an emergency shutoff valve, etc.) to prohibit the gaseous fuel from reaching the gas burner 102. For example, the shutoff valve may be positioned between the input port 120 and the gas burner 102, on the input side of the input port 120 (e.g., between the input port 120 and the gaseous fuel source), etc.

The gas port system 108 may be coupled to the gas burner 102 via one or more valves, nozzles, etc. For example, the gas port system 108 of FIG. 1 is coupled to a nozzle 130 for passing the gaseous fuel to the gas burner 102. In some embodiments, the nozzle 130 may include one or more openings to allow air to enter the nozzle 130. As such, a desirable mixture of air and gaseous fuel may be created and passed into the gas burner 102.

The gas control system 110 of FIG. 1 controls an amount of gaseous fuel received by the gas burner 102. For example, the gas control system 110 may include one or more components such as valves, etc. for controlling the amount of the gaseous fuel flowing in the conduits between the gas port system 108 and the gas burner 102.

In some embodiments, the components of the gas control system 110 may be controllable. For example, and as shown in FIG. 1, the gas control system 110 may include a valve 128 coupled between the gas port system 108 and the gas burner 102 and a control 122 in communication with the valve 128 for controlling the amount of gas supplied to the gas burner 102 via the input port 120. In the example of FIG. 1, the control 122 may be rotated between two or more positions. Each position may allow a different amount of gaseous fuel to the gas burner 102 as explained above. In some examples, and as further explained below, the gas control system 110 may include indicia on the faceplate 116 to represent the amount of gaseous fuel supplied to the gas burner 102.

Alternatively, the gas control system 110 may include another suitable control for controlling the amount of the gaseous fuel supplied to the gas burner 102. For example, the gas control system 110 may include a lever, a switch, etc. to adjust the amount of the gaseous fuel supplied to the gas burner 102.

As explained above, the ignition system 112 of FIG. 1 is positioned on the faceplate 116 of the housing for igniting the gas burner 102. In the example embodiment of FIG. 1, the ignition system 112 includes an automatic igniter. For example, the ignition system 112 includes a push-button igniter 124 for initiating a spark or the like to ignite the gaseous fuel near the gas burner 102. The ignition system 112 may utilize any suitable ignition systems including, for example, a piezo ignition system, electronic ignition system, etc. Additionally, although the ignition system 112 of FIG. 1 includes the push-button igniter 124 as its input device, it should be apparent that other suitable input devices (e.g., a lever, etc.) may be employed without departing from the scope of the disclosure.

Additionally and/or alternatively, the ignition system 112 may include an opening for receiving a lighter, match, etc. for igniting the gaseous fuel near the gas burner 102. In such examples the opening may be defined by the faceplate 116, the vessel of the grill (e.g., not on the faceplate 116), etc.

The faceplate 116 of the housing 104 may substantially cover the vessel opening of the grill. In some examples, the faceplate 116 may have a size (e.g., an area, etc.) larger than the vessel opening. Thus, when the unit 100 is inserted into the vessel opening, portions of the faceplate 116 may extend beyond the perimeter of the vessel opening. In such embodiments, the unit 100 may include one or more gaskets, etc. adjacent these portions on the interior side (e.g., relative to the grill) of the faceplate 116 to create a seal between the unit 100 and the grill. As such, minimal amounts air may pass into and/or out of the grill via the faceplate 116.

As shown in FIG. 1, the faceplate 116 of the housing 104 defines the openings 106 (e.g., vents, etc.) for allowing air to pass into or out of the grill. This airflow into or out of the grill may help maintain a combustible environment (e.g., proper gaseous concentrations of the gaseous fuel, oxygen, etc.), control temperature inside the grill, cool the gas burner 102 and/or other components of the unit 100 when the gas burner 102 is off, etc. Although the openings 106 of FIG. 1 are shown adjacent a middle portion of the faceplate 116, it should be apparent that the openings 106 may be positioned in any suitable location on the faceplate 116, etc.

In some embodiments, airflow through the openings 106 may be controlled. For example, the unit 100 may include structure (e.g., dampers, etc.) adjacent the openings 106 to restrict airflow. In other embodiments, airflow may be controlled by other components of the grill (e.g., vents of top of the grill, etc.) in addition to or in place of the controllable structure near the opening 106.

In the example removable gas unit 100 of FIG. 1, the gas burner 102 receives gaseous fuel from the gas port system 108 via various conduits, etc. As mentioned above, the gas burner 102 is positioned below the fire bowl opening such that heat from the burner burning the gaseous fuel may pass into the fire bowl which may include one or more grates supporting food (e.g., proteins, vegetables, etc.).

In the example of FIG. 1, the gas burner 102 and the fire bowl opening may have a similar geometrical shape and size. As such, minimal heat may be lost when passing from the gas burner 102 into the fire bowl. For example, the gas burner 102 and the fire bowl opening may be substantially circular, and the circumferences of the burner and the opening may be substantially equal. In other examples, the gas burner 102 and/or the fire bowl opening may be substantially oval, substantially rectangular, etc. and/or the size (e.g., an area, a circumference, etc.) of the gas burner 102 may be smaller or larger than the size of the fire bowl opening.

As shown in FIG. 1, the gas burner 102 is an open flame burner. As such, the gas burner 102 may ignite the gaseous fuel (via the ignition system 112 explained above) to produce one or more open flames which heats air to cook food in the grill. Alternatively, and as further explained below, the gas burner 102 may include an infrared burner as further explained below. In some embodiments, the gas burner 102 may be modified such that a user can remove the open flame burner and insert an infrared burner.

Although the removable gas unit 100 includes components having particular shapes and sizes, it should be apparent that any one of these components may be another suitable shape and/or size. For example, the faceplate 116 of FIG. 1 has a substantially rectangular shape. In other embodiments, however, the faceplate 116 may a substantially oval shape, a substantially circular shape, a substantially triangular shape, etc.

Figure 2:
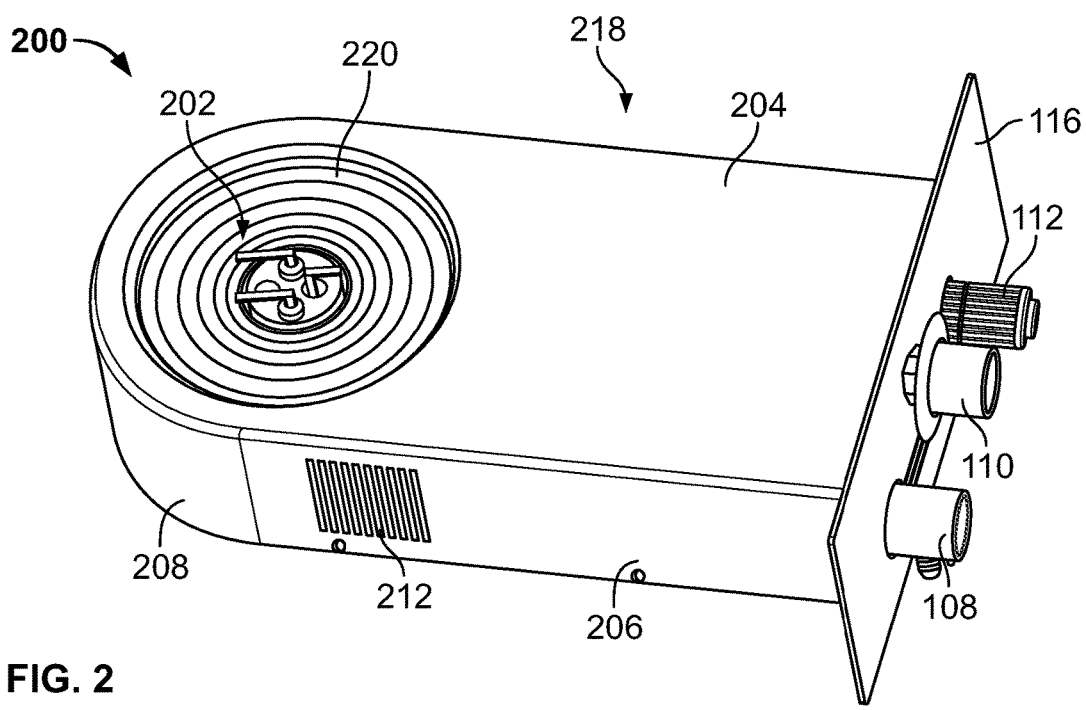
FIG. 2 is a perspective view of a removable gas unit insertable through an opening of a grill, and including a housing substantially enclosing a gas burner according to another example embodiment.
Figure 3:
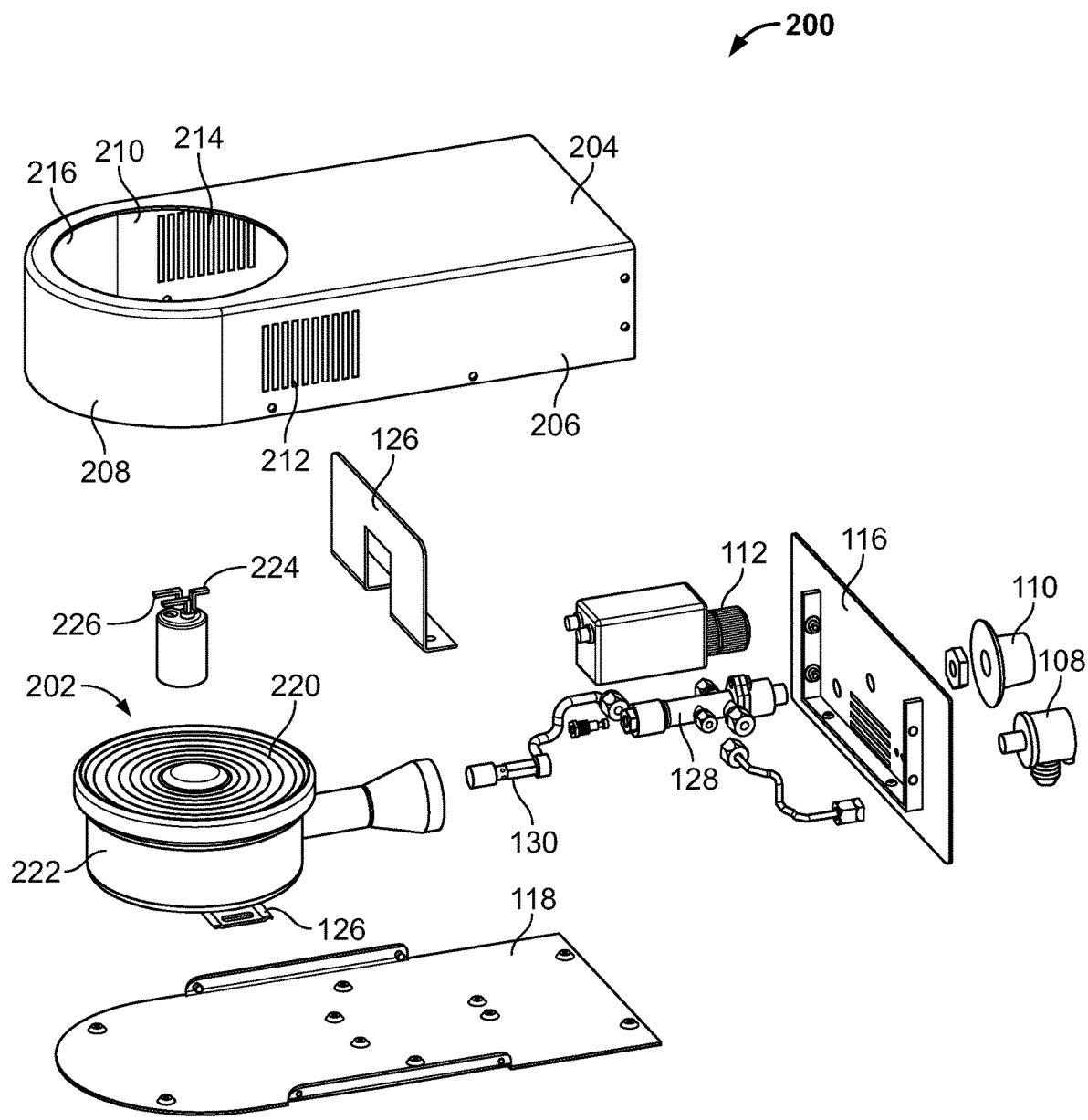
FIG. 3 is an exploded perspective view of the unit of FIG. 2.

FIGS. 2 and 3 illustrate another example apparatus 200 (e.g., a removable gas unit, etc.) for supplying gaseous fuel to a kamado-style grill. The apparatus 200 is substantially similar to the apparatus 100 of FIG. 1, but includes a housing 218 and a gas burner 202. The housing 218 may house various components including, for example, the gas burner 202, one or more of optional features (e.g., the structural supports 126, the gas port system 108 including the valve 128, the gas control system 110, the ignition system 112, the nozzle 130, etc. explained above with reference to FIG. 1), etc.

As shown in FIGS. 2 and 3, the housing 218 includes the base support 118 and the faceplate 116 of FIG. 1, a top wall 204, and side walls 206, 208, 210 extending between the top wall 204 and the base support 118. The base support 118, the top wall 204, and the side walls 206, 210 extend from the faceplate 116. As explained above, at least portions of the gas port system 108, the gas control system 110, the ignition system 112, etc. may be positioned on the exterior side (e.g., relative to the grill) of the faceplate 116 of the housing 104.

In the example of FIGS. 2 and 3, the top wall 204 includes an opening 216 adjacent a top side of the gas burner 202. For example, and as shown best in FIG. 2, the top side of the gas burner 202 is recessed below the opening 216. This opening 216 may have a substantially similar shape and size as the top side of the gas burner 202 and/or the fire bowl opening (as explained above). As such, minimal heat may be lost when passing from the gas burner 202 into the fire bowl. Alternatively, the opening 216 may have a different shape and/or size than the gas burner 202 and/or the fire bowl opening.

As shown in FIGS. 2 and 3, the side wall 208 includes a curved portion extending between the side walls 206, 210, and opposing the faceplate 116. The curved portion of the side wall 208 may be shaped to conform to the shape and/or size of the gas burner 202. For example, the side wall 208 of FIGS. 2 and 3 has a substantially semicircular (e.g., half circle, etc.) shape confirming to the substantially circular shape of the gas burner 202. Alternatively, the side wall 208 may be another other suitable shape including, for example, a substantially triangular, substantially planar, etc. depending on available space inside the grill, the shape and size of the gas burner 202, material used, etc.

The side walls 206, 208, 210, the top wall 204, the faceplate 116, and/or the base support 118 may be coupled together (if applicable) via any suitable fastener including, for example, one or more mechanical fasteners such as screws, bolts, rivets, etc., one or more welds, etc. Additionally, one or more of the walls, the faceplate, and the base support may be formed of one piece of material. For example, the side walls 206, 210, and the curved side wall 208 may be formed of one piece of stainless steel and then coupled to the top wall 204, the faceplate 116, and the base support 118 as explained above.

Additionally, as shown in FIGS. 2 and 3, the side walls 206, 210 define openings 212, 214, respectively. The openings 212, 214 allow air to pass (e.g., vent, etc.) into or out of the removable gas unit 200. For example, air may enter the openings 106 on the faceplate 116 and pass into the grill via one or both sets of openings 212, 214 on the side walls 206, 210. As explained above, this airflow may help maintain a combustible environment, control temperature, etc.

Although each side wall 206, 210 includes ten rectangular shaped openings 212, 214 positioned adjacent the gas burner 202, it should be apparent that more or less openings having any suitable shape may be positioned in any suitable location in the side walls 206, 210. Additionally and/or alternatively, the side wall 208, the top wall 204 and/or the base support 118 may include one or more openings having any suitable shape (e.g., similar to the openings 212, 214).

In the example embodiment of FIG. 2, the gas burner 202 includes an infrared burner. For example, the gas burner 202 may ignite gaseous fuel to heat a ceramic tile, etc. (e.g., represented by reference number 220), causing the tile to emit infrared radiation to cook the food in the grill.

The gas burner 202 of FIG. 2 may include various components for receiving, igniting, etc. the gaseous fuel. For example, and as shown in FIG. 2, the gas burner 202 includes a core 222 for receiving the gaseous fuel from the gas port system 108, an ignition component 266, and a probe 224. In some embodiments, the ignition component 266 may include one or more needles that create a spark when the ignition system 112 is operated as explained above. This spark may ignite the gaseous fuel. Alternatively, the ignition component 266 may include another suitable feature to ignite the gaseous fuel. The probe 224 of FIG. 2 may be a quench protection probe for sensing a temperature of the infrared burner. For example, if the temperature is undesirable such that quenching may occur in the burner, a control signal may be sent to a valve (e.g., an electromagnetic valve, etc.) to shut down the burner, adjust the amount of gaseous fuel received, etc.

Figure 4:
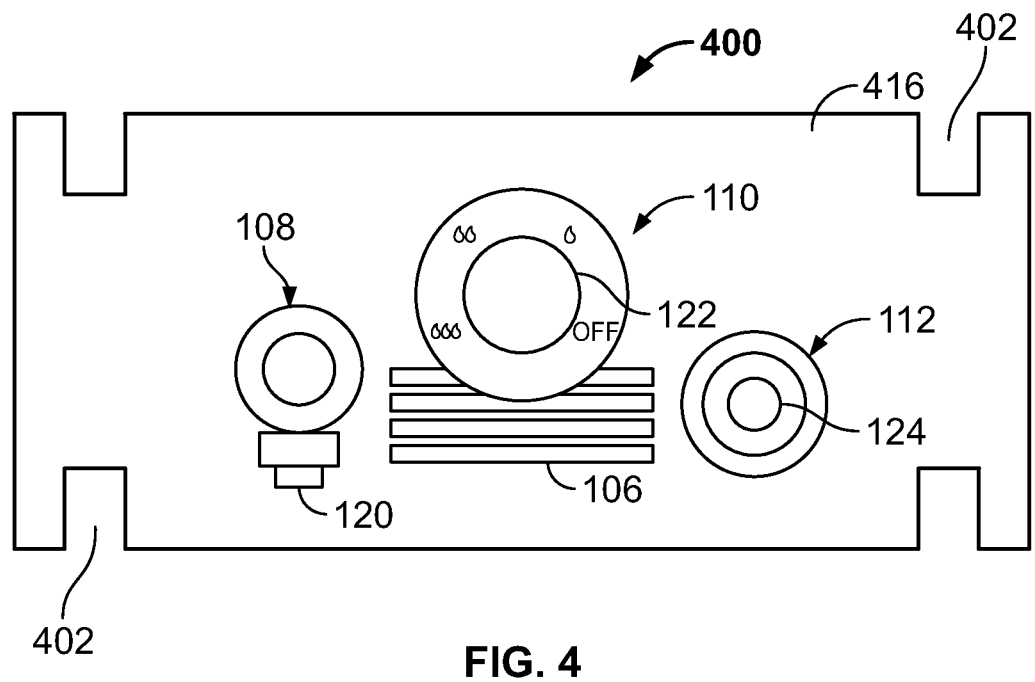
FIG. 4 is a front view of a removable gas unit including a faceplate having a gas port, a gas control, an automatic ignitor, and notches according to another example embodiment.

FIG. 4 illustrates an apparatus 400 for supplying gaseous fuel to a kamado-style grill (not shown). The apparatus 400 of FIG. 4 is substantially similar to the apparatus 100 of FIG. 1. For example, although not shown in FIG. 4, the apparatus 400 (e.g., the removable gas unit, etc.) includes a gas burner and a housing as disclosed herein. In such examples, the apparatus 400 may include the gas burner 102 of FIG. 1 and the housing 218 of FIGS. 2 and 3.

The faceplate 416 of FIG. 4 is substantially similar to the faceplate 116 of FIGS. 1-3. For example, the faceplate 416 may be a portion of the housing (e.g., the housing 104, the housing 218, etc.) for supporting various components of the apparatus 400. Thus, and as shown in FIG. 4, the faceplate 416 may support at least portions of the gas port system 108 of FIG. 1 including its input port 120, the gas control system 110 of FIG. 1 including its control 122, and the ignition system 112 of FIG. 1 including its igniter 124. Additionally, and as explained above, the faceplate 416 may define the openings 106 of FIG. 1 for allowing air to pass into or out of the grill.

As shown in FIG. 4, the gas control system 110 includes indicia to represent the amount of gaseous fuel supplied to the gas burner. For example, the indicia of FIG. 4 includes an OFF position representing no gaseous fuel being supplied to the gas burner, a single flame position representing a small amount of gaseous fuel being supplied to the gas burner, a two flame position representing a larger amount of gaseous fuel (compared to the single flame position) being supplied to the gas burner, and a three flame position representing the largest amount of gaseous fuel being supplied to the gas burner. Alternatively, any other suitable indicia, more or less control positions, etc. may be employed if desired. For example, the gas control system 110 may include five Roman numerals, eight Arabic numerals, two letters, etc.

Figure 6:
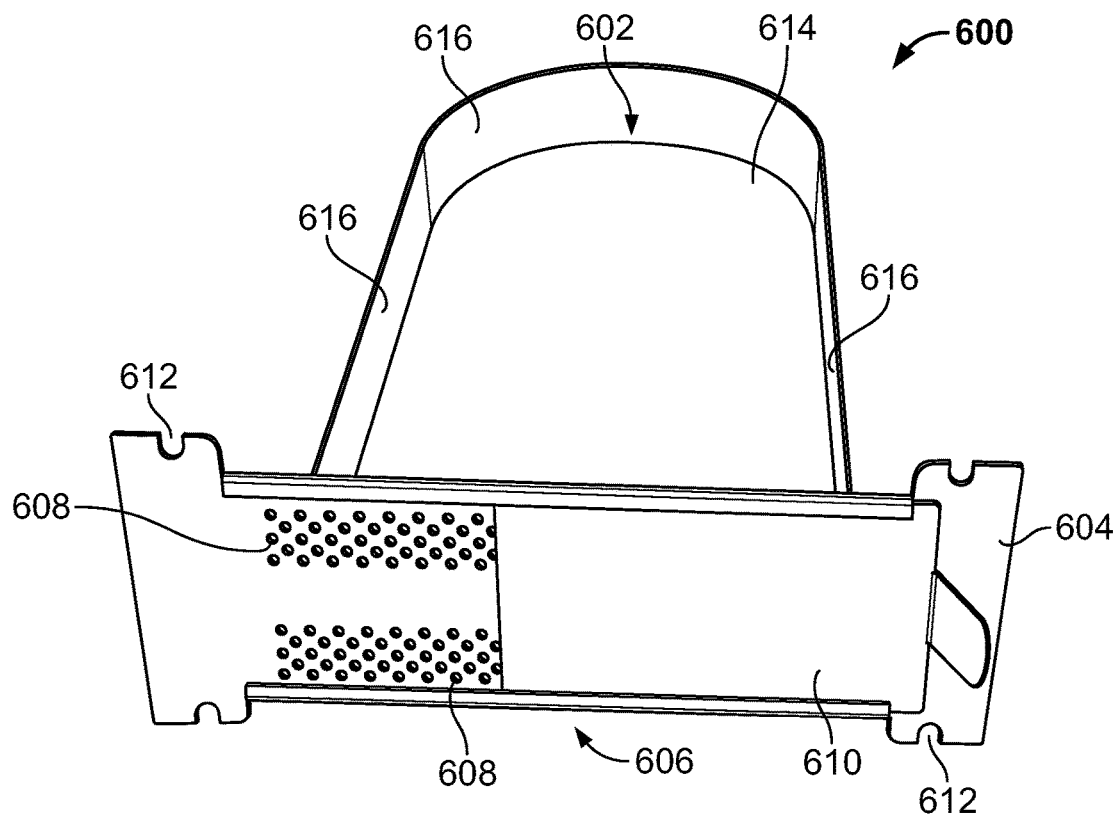
FIG. 6 is a perspective view of a removable charcoal unit insertable through an opening of a grill and including a receptacle for collecting ashes according to another example embodiment.

Additionally, the faceplate 416 of FIG. 6 includes four corners and a notch 402 positioned adjacent each corner of the faceplate 416. As further explained below, the notches 402 may be used to secure the apparatus 400 to the grill when the apparatus 400 is inserted in the grill.

In the example embodiment of FIG. 4, the notches 402 define at least a portion of the faceplate's perimeter. Alternatively, one or more of the notches 402 may be positioned within the faceplate's perimeter such that these notches do not define portions of the faceplate's perimeter. For example, two of the notches 402 may be define portions of the faceplate's perimeter and the other two notches 402 may not.

As shown in FIG. 4, the faceplate 416 and the notches 402 have a substantially rectangular shape. Alternatively, the faceplate 416 and/or the notches 402 may have any other suitable shape including for example a substantially oval shape, a substantially triangular shape, etc. Additionally, although the faceplate 416 of FIG. 4 includes four notches, each positioned adjacent a corner of the faceplate 416, it should be apparent that more or less notches may be employed and positioned at any suitable location. For example, the faceplate 416 may include 3 notches, each positioned near a middle portion of a side of the faceplate 416. In other embodiments, notches may be positioned within the perimeter of the faceplate 416 as explained above.

Figure 5:
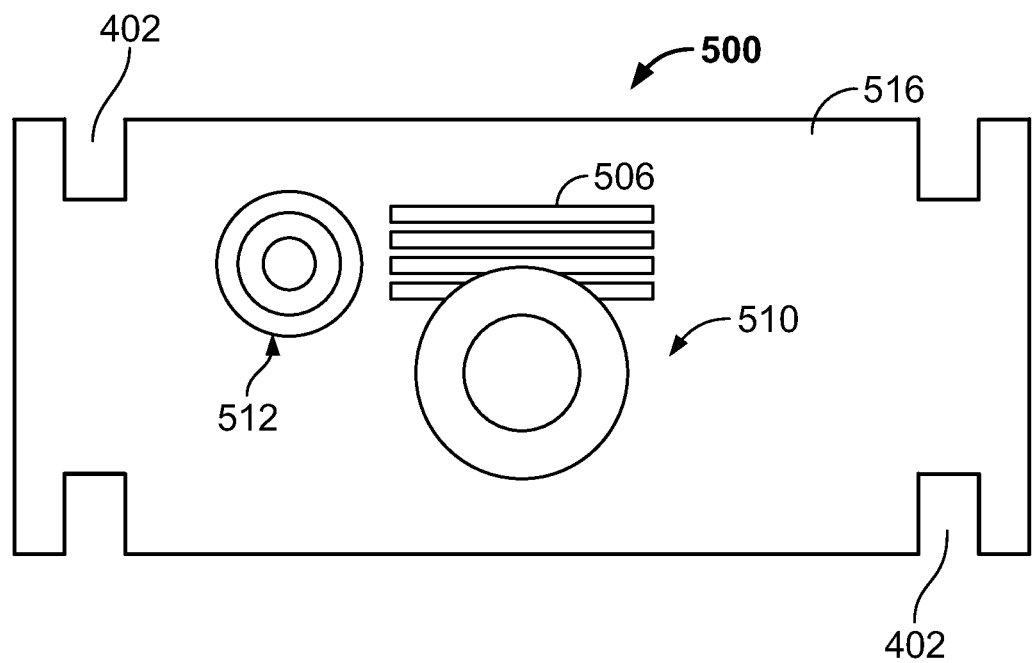
FIG. 5 is a front view of a removable unit including a faceplate having notches according to yet another example embodiment.

FIG. 5 illustrates an apparatus 500 for supplying gaseous fuel to a kamado-style grill (not shown). The apparatus 500 of FIG. 5 is substantially similar to the apparatus 400 of FIG. 4, but does not include a gas port system.

As shown in FIG. 5, the apparatus 500 includes a faceplate 516 for supporting a gas control system 510, an ignition system 512, and openings 506. The faceplate 516 of FIG. 5 is substantially similar to the faceplate 416 of FIG. 4. For example, the faceplate 516 includes the four notch 402 each positioned adjacent a corner of the faceplate 516.

The gas control system 510, the ignition system 512, and the openings 506 are substantially similar (e.g. have the same functionality, etc.) to the control system 110, the ignition system 112, and the openings 106 of FIGS. 1-4. The gas control system 510, the ignition system 512, and the openings 506, however, are positioned in different locations on the faceplate 516 compared to the similar functional components of FIG. 4.

FIG. 6 illustrates another example of an apparatus 600 insertable through an opening of a vessel for positioning below an opening of a fire bowl positioned in the vessel as further explained below. As shown in FIG. 6, the apparatus 600 (e.g., sometimes referred to as a removable apparatus, a removable unit, a removable charcoal unit, etc.) includes a faceplate 604, a receptacle 602 extending from the faceplate 604, and a vent system 606 positioned on the faceplate 604.

As shown in FIG. 6, the receptacle 602 of FIG. 6 includes various walls to define an interior region. Thus, the receptacle 602 may collect ashes passing through the fire bowl opening from charcoal burned in the fire bowl. The unit 600 including the receptacle 602 may then be removed (via the vessel opening) to dispose of the ashes.

In particular, the receptacle 602 of FIG. 6 includes a bottom wall 614 and side walls 616 extending from the bottom wall 614. The side walls 616 and/or the bottom wall 614 may be formed of one continuous piece of material, various pieces of material coupled together via mechanical fasteners, welds, etc. In other embodiments, the receptacle 602 may include a portion of the sidewall 616 extending from the bottom wall 614, no sidewall, etc.

The faceplate 604 may be similar to the faceplate 116 of FIG. 1. For example, the faceplate 604 may substantially cover the vessel opening of the grill. In such examples, the faceplate 604 may have a size (e.g., an area, etc.) larger than the vessel opening such that portions of the faceplate 604 extend beyond the vessel opening when the unit 600 is inserted into the vessel opening.

Additionally, the faceplate 604 of FIG. 6 includes notches 612 substantially similar to the notches 402 of FIG. 4. For example, the faceplate 604 includes one notch 612 positioned adjacent each corner of the faceplate 604. The notches 612 may be used to secure the unit 600 to the grill as explained herein.

In the example of FIG. 6, the vent system 606 includes vent openings 608 to allow air to pass into or out of the grill including the removable charcoal unit 600, and a vent cover 610 movable to adjust the amount of air flowing through the grill via the vent openings 608. For example, and as shown in FIG. 6, the vent cover 610 may be horizontally moved from one position to another position to adjust the amount of air flowing through the grill.

As shown in FIG. 6, the vent cover 610 is positioned in an open position allowing air to pass into or out of the grill. If desired, however, the vent cover 610 may be moved into another positioned to at least partially reduce the amount of air passing into or out of the grill. For example, the vent cover 610 may be positioned in a closed position to substantially restrict air from passing into or out of the grill. In other examples, the vent cover 610 may be positioned between the open position and the closed position.

Alternatively, the vent system 606 may include another suitable vent cover, vent openings, etc. to control the amount of air passing into or out of the grill. For example, the vent system 606 may include one or more vertically movable vent covers, rotatable vent covers, etc. to control the amount of air passing into or out of the grill.

Figure 7:
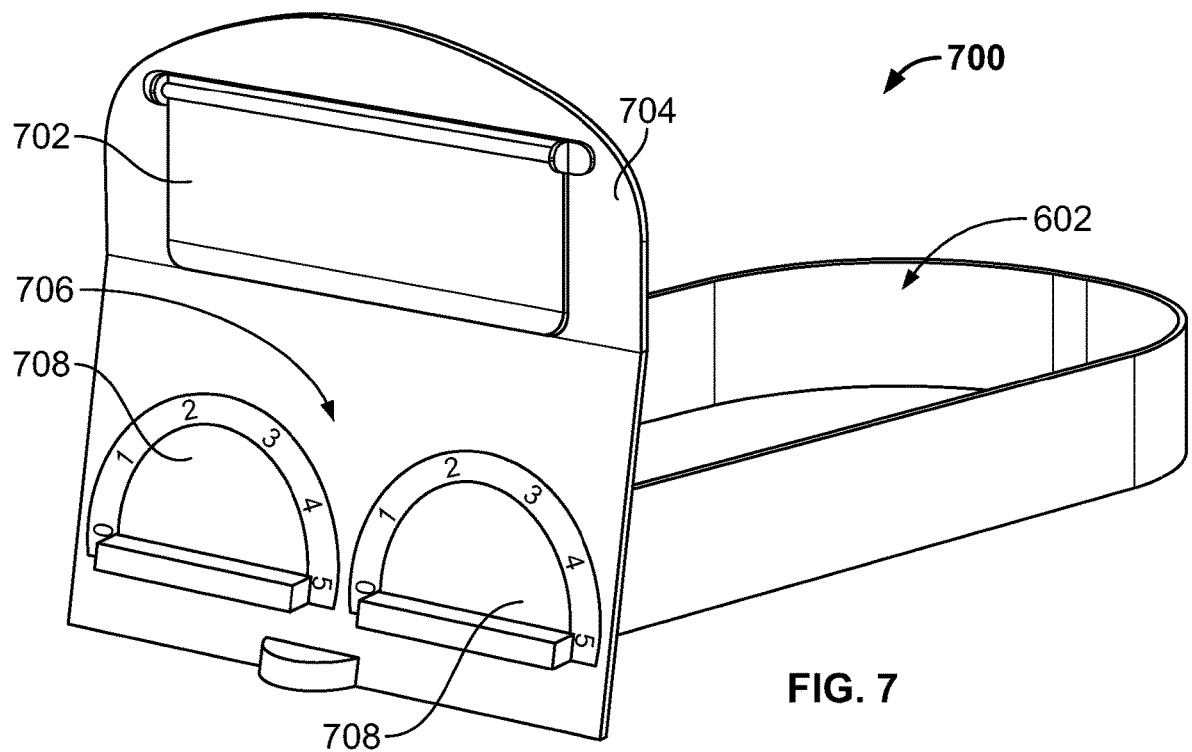
FIG. 7 is a perspective view of a removable charcoal unit insertable through an opening of a grill, and including an opening for a starter device according to yet another example embodiment.

For example, FIG. 7 illustrates another removable charcoal unit 700 insertable through an opening of a vessel for positioning below an opening of a fire bowl as explained herein. As shown in FIG. 7, the unit 700 includes a faceplate 704, the receptacle 602 of FIG. 6 extending from the faceplate 704, a vent system 706 positioned on the faceplate 704, and a cover panel 702 coupled to the faceplate 704.

As shown in FIG. 7, the vent system 706 includes vent covers 708 rotatable to control the amount of air passing into or out of the grill including the unit 700. For example, the vent covers 708 may be rotated to selectively cover and/or expose openings (not shown) in the faceplate 704. In the example of FIG. 7, the vent system 706 includes indicia (e.g., Arabic numerals) adjacent the vent covers 708 to represent an amount of air passing into or out of the grill.

The cover panel 702 of FIG. 7 is coupled to the faceplate 704 to selectively allow and inhibit access into the grill via another opening (not shown) in the faceplate 704. For example, the vessel may include one or more openings in addition to and/or alternative to the vessel opening for receiving the unit 700. Additionally, the fire bowl may include another opening. In such examples, the cover panel 702 may be moved into an open position and a starter device (e.g., an electric starter device, a butane starter, a lighter, a match, etc.) may be inserted into the grill via the faceplate opening. The starter device may then pass through an opening in the vessel (e.g., the same opening for receiving the unit 700, a different vessel opening, etc.) and an opening in the fire bowl for igniting charcoal positioned in the fire bowl.

In the embodiment of FIG. 7, the cover panel 702 is pivotally coupled to the faceplate 704 by a spring-type hinge extending along a top, substantially horizontal edge of the cover panel 702. As such, the cover panel 702 may pivot between a closed position (as shown in FIG. 7) and an open position for receiving a starter device. Alternatively, the cover panel 702 could be coupled to the faceplate 704 in another suitable manner including, for example, slidably coupled, removably coupled, etc.

Figure 8:
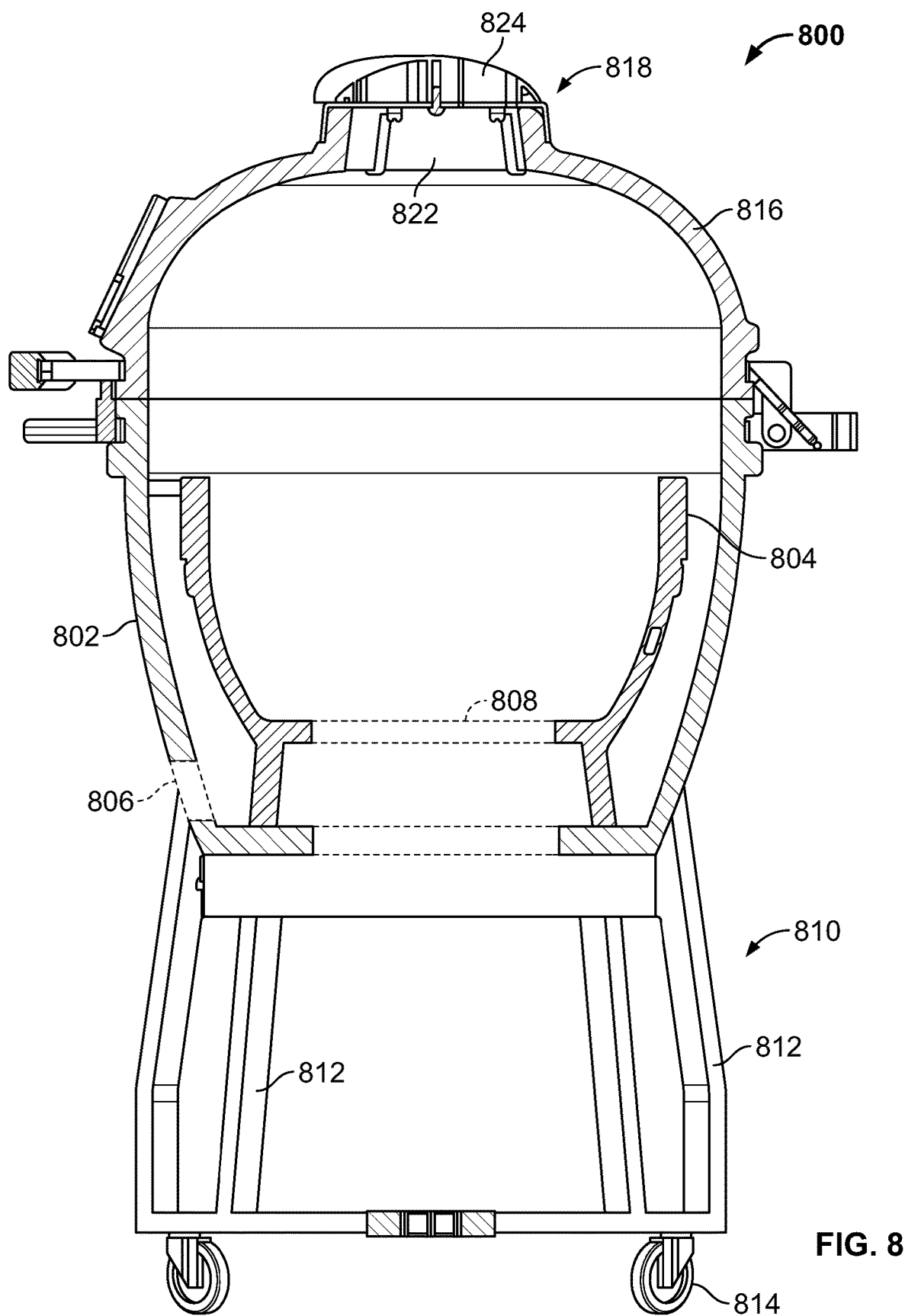
FIG. 8 is a cross sectional side view of a kamado-style grill including a vessel and a fire bowl according to another example embodiment.

FIG. 8 illustrates a kamado-style grill 800 including a vessel 802 and a fire bowl 804 for supporting charcoal (if employed). The fire bowl 804 may be removably positioned within the vessel 802 such that it can be removed from the vessel 802 and then subsequently positioned back in the vessel 802. As such, a user can clean the fire bowl 804, replace the fire bowl, etc. as desired.

As shown in FIG. 8, the vessel 802 includes an opening 806 extending between an interior of the vessel 802 and an exterior of the vessel 802, and the fire bowl 804 includes an opening 808 extending between an interior of the fire bowl 804 and an exterior of the fire bowl 804. The vessel opening 806 receives a removable unit (not shown) including, for example, any one of the removable units disclosed herein. For example, and as further explained below, a removable unit may inserted through the vessel opening 806 for positioning below the fire bowl opening 808 such that one or more components (e.g., a receptacle, a gas burner, etc.) of the inserted removable unit aligns with the fire bowl opening 808.

As explained above, the removable units inserted into the kamado-style grill 800 may be interchangeable such that the grill 800 may operate differently depending on the particular unit employed. For example, the vessel opening 806 may receive a removable gas unit (e.g., one of the removable gas units disclosed herein such as the removable gas unit 200, etc.), and the grill 800 may operate as a gas fired grill. In other examples, the vessel opening 806 may receive a removable charcoal unit (e.g., one of the removable charcoal units disclosed herein such as the removable charcoal unit 700, etc.) when the removable gas unit is removed. In such examples, the grill 800 may operate as a charcoal fired grill. If desired, the grill 800 may operate as a charcoal fired grill when a removable gas unit is employed if charcoal is placed in the fire bowl 804.

The removable units may be inserted and removed from the kamado-style grill 800 by sliding the removable units into and out of the vessel opening 806 in, for example, a substantially horizontal direction. In some embodiments, the dimensions (e.g., the width, etc.) of the removable units may correspond to interior portion(s) of the vessel 802 such that the removable units may slide into and out of the vessel 802 without substantial movement in another plane. For example, the interior portion(s) of the vessel 802 may function as one or more guide rails, etc. such that once a removable unit is inserted into the vessel opening 806, the removable unit may not substantially move in a vertical direction, in another horizontal plane, etc.

Additionally, the grill 800 may include various other optional features. For example, the grill 800 may include a support structure 810 for supporting the vessel 802 and the fire bowl 804. As shown in FIG. 8, the support structure 810 includes four legs 812 and casters 814 coupled to the legs 812. As such, the grill 800 can be supported by the support structure 810 and be moved as desired.

Further, the grill 800 may include an optional lid 816 and an optional vent system 818 positioned adjacent a top of the grill 800. In particular, the vent system 818 is coupled to a top portion of the lid 816. As shown in FIG. 8, the vent system 818 may include a vent opening 822 and a vent cover 824 movable with respect to the vent opening 822 for controlling the amount of air flowing through the grill 800.

The lid 816 may be detachably coupled to the vessel 802. For example, and as shown in FIG. 8, the lid 816 may be detachably coupled to the vessel 802 via one or more mechanical fasteners 820 such as hinges, clamps, etc. In other embodiments, the lid 816 may be coupled to the vessel 802 without mechanical fasteners. In such examples, the lid may rest on to the vessel.

Figure 9:
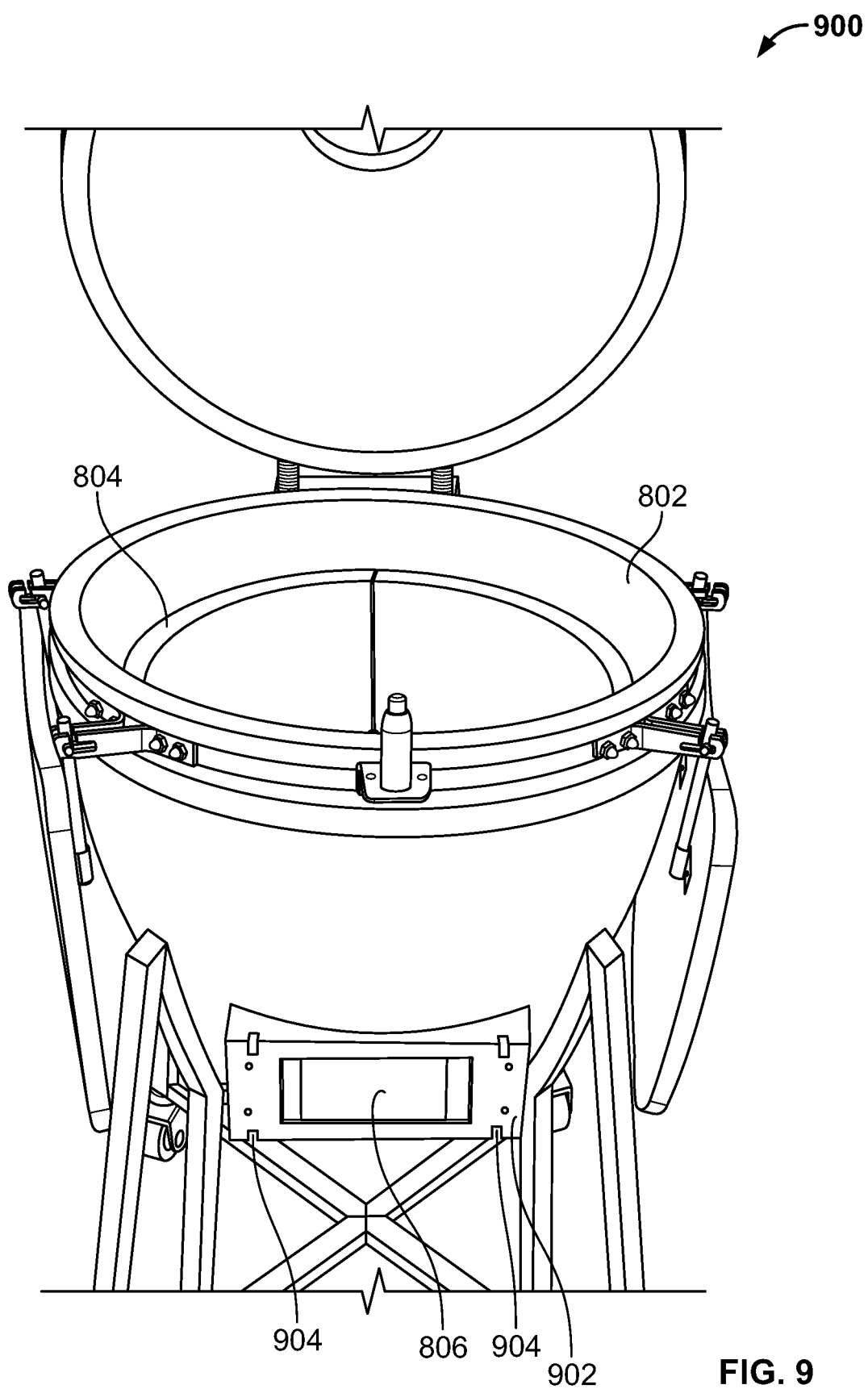
FIG. 9 is a perspective view of a kamado-style grill including a vessel, a fire bowl, and an attachment interface coupled to the vessel according to yet another example embodiment.

FIG. 9 illustrates another example kamado-style grill 900 substantially similar to the grill 800 of FIG. 8. For example, the grill 900 includes the vessel 802 having the opening 806 and the fire bowl 804 of FIG. 8. Additionally, and as shown in FIG. 9, the grill 900 includes an attachment interface 902 coupled to the vessel 802 adjacent the vessel opening 806. The attachment interface 902 receives a removable unit including, for example, any one of the removable units disclosed herein when the unit is inserted in the vessel opening 806.

As shown in FIG. 9, the attachment interface 902 includes four corners and a notch 904 positioned adjacent each corner of the attachment interface 902. In some embodiments, the notches 904 may align with other structural components to secure a removable unit to the grill 900. For example, if the removable unit 500 of FIG. 5 is inserted into the vessel opening 806 of FIG. 9, the notches 402 of the faceplate 516 may align with the notches 904 of the attachment interface 902. Each set of aligned notches 402, 904 may receive one or more locking devices for securing the removable unit 500 to the attachment interface 902 as further explained below.

Figure 10:
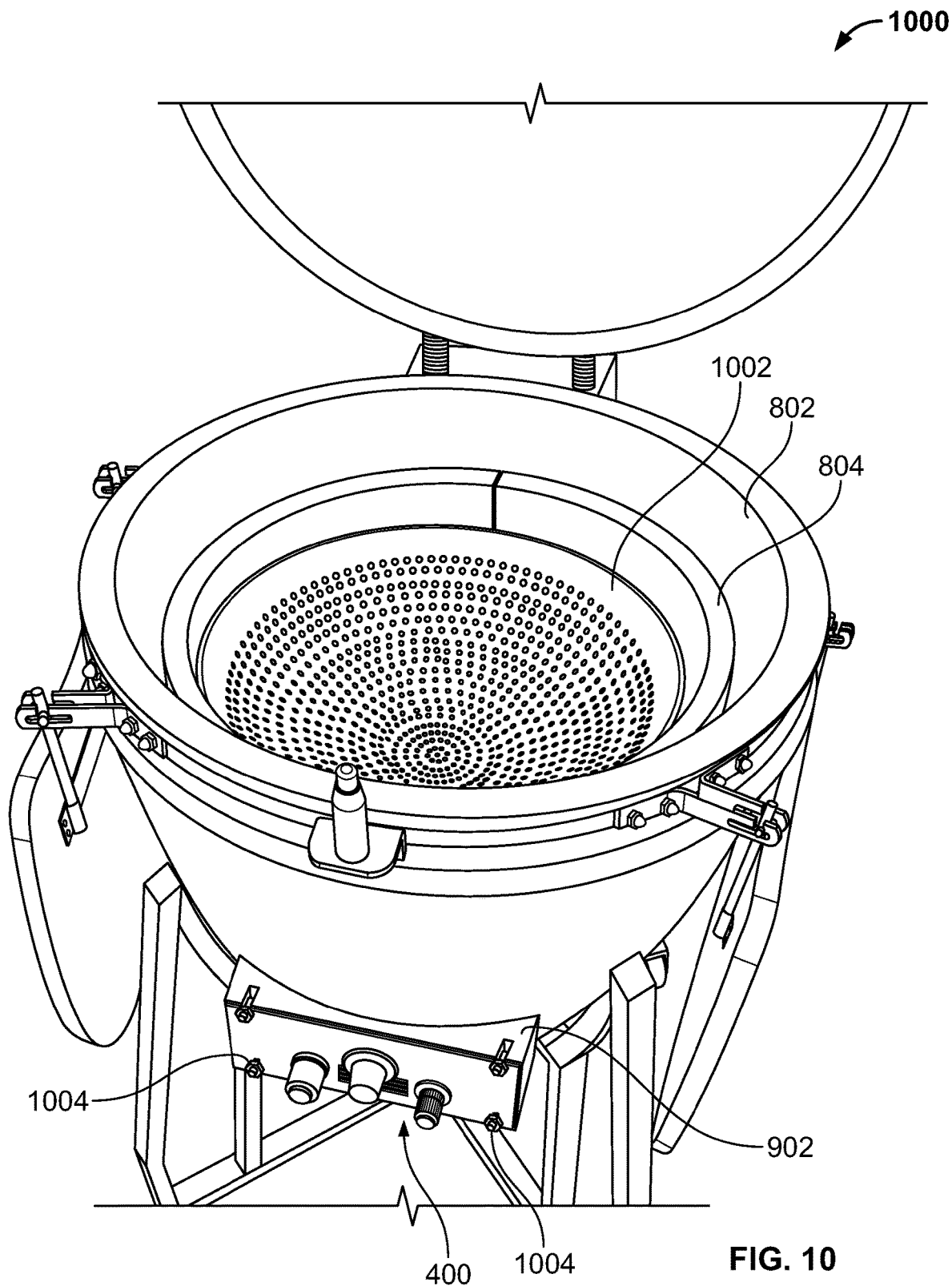
FIG. 10 is a perspective view of a kamado-style grill including a vessel, a fire bowl, and the removable unit of FIG. 4 according to another example embodiment.

FIG. 10 illustrates another example kamado-style grill 1000 substantially similar to the grill 900 of FIG. 9, but including a flame barrier 1002 positioned in the fire bowl 804 and the removable gas unit 400 of FIG. 4 coupled to the attachment interface 902. The flame barrier 1002 of FIG. 10 may minimize flames from entering the interior portions of the fire bowl 804.

The removable gas unit 400 may be inserted through the opening (not shown in FIG. 10) of the vessel 802 for positioning below the fire bowl opening (not shown in FIG. 10). After the unit 400 is inserted through the vessel opening, the gas burner of the unit 400 may align with the fire bowl opening as explained above.

After the removable gas unit 400 is inserted through the vessel opening and positioned in a desired location, one or more locking devices may be employed to secure the unit 400 to the attachment interface 902. For example, the unit 400 may be positioned such that the notches 402 of the unit 400 and the notches 904 of the attachment interface 902 are substantially aligned. When the notches are substantially aligned, a bolt 1004 may be inserted in one or more aligned set of notches 402, 904 to secure the unit 400 to the attachment interface 902. Although the locking devices of FIG. 10 include four bolts 1004, it should be apparent that any other suitable devices may be employed including, for example, screws, wing nuts, clamps, rivets, etc. Additionally, more or less locking devices may be employed if desired.

Figure 11A:
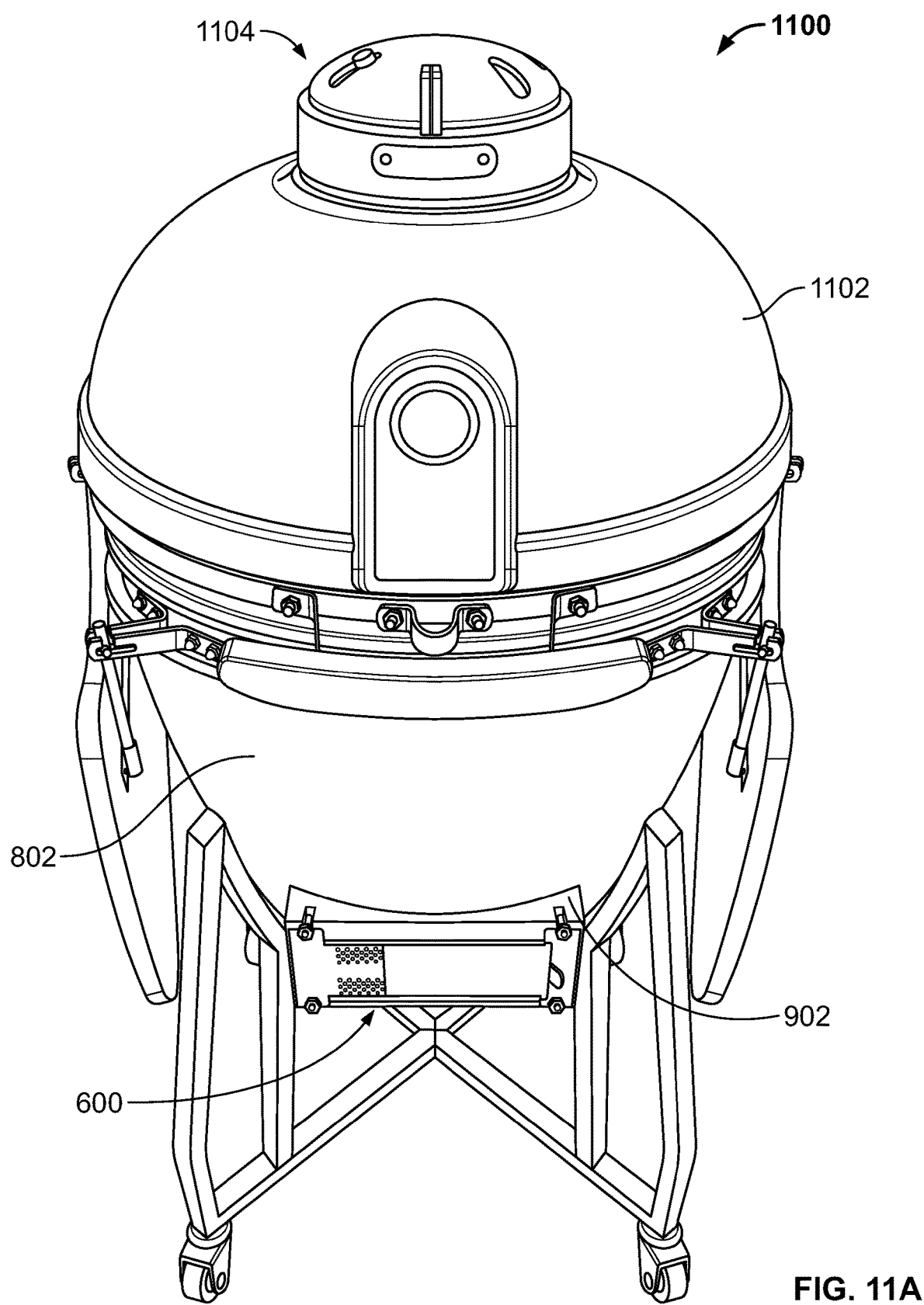
FIG. 11A is a perspective view of a kamado-style grill including a vessel, a fire bowl, and the removable unit of FIG. 6 according to yet another example embodiment.
Figure 11B:
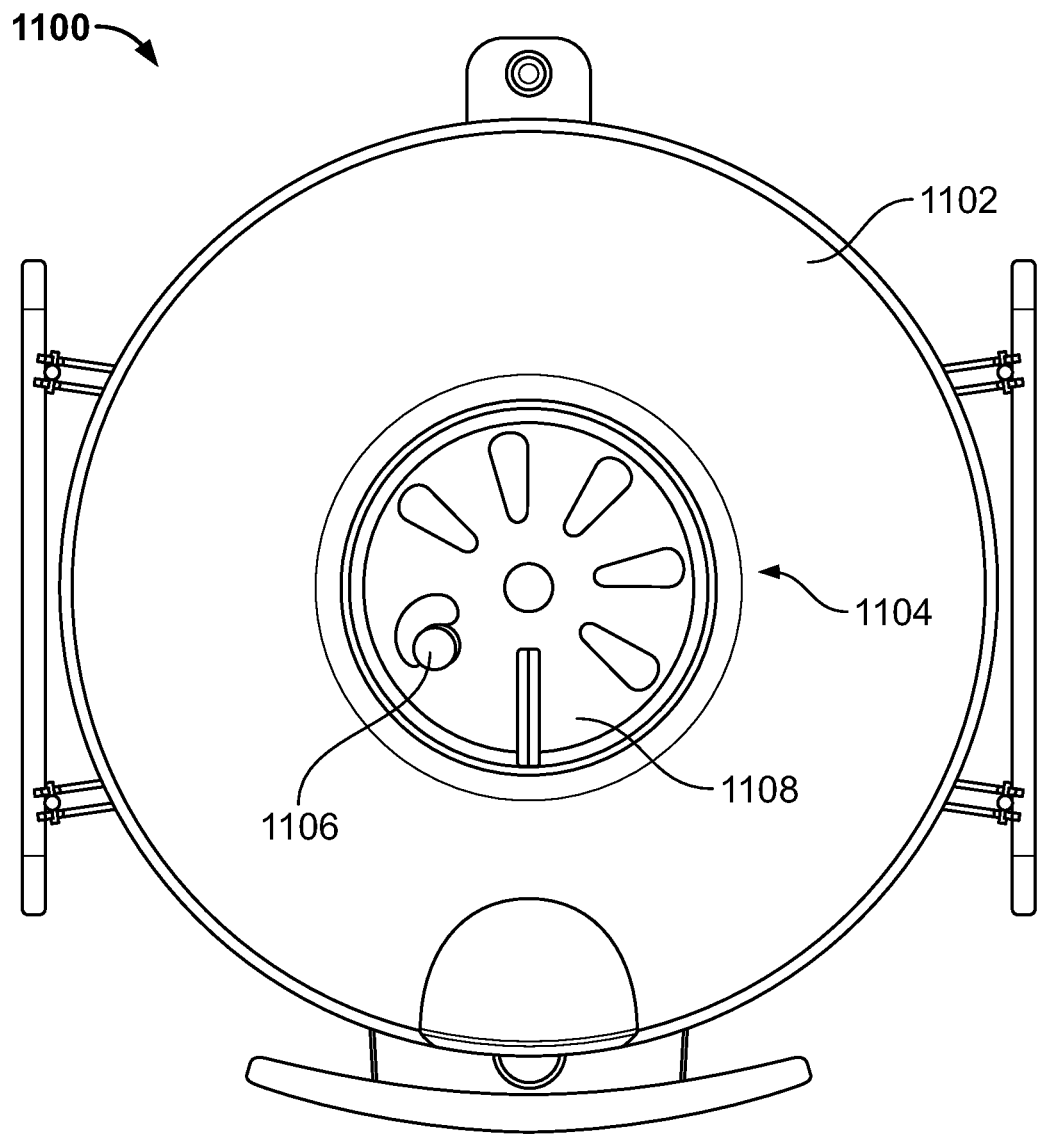
FIG. 11B is a top view of the grill of FIG. 11A.

FIGS. 11A and 11B illustrate another example kamado-style grill 1100 substantially similar to the grill 1000 of FIG. 10, but including the removable charcoal unit 600 of FIG. 6 coupled to the attachment interface 902. In particular, the unit 600 may be inserted through the opening (not shown in FIG. 11) of the vessel 802 for positioning below the fire bowl opening (not shown in FIG. 11). After the unit 600 is inserted through the vessel opening, the receptacle of the unit 600 may align with the fire bowl opening as explained above. As such, the opening of the vessel 802 may receive different removable units having different functions, capabilities, characteristics, etc.

Additionally, and as shown in FIGS. 11A and 11B, the grill 1100 includes an optional lid 1102 and an optional vent system 1104 positioned adjacent the lid 1102. The vent system 1104 may include one or more vent openings and a vent cover 1108 movable with respect to the vent openings for controlling the amount of air flowing through the grill 1100. Further, the vent system 1104 may include an optional control 1106 positioned on the vent cover 1108 for controlling the amount of air flowing through the grill 1100. As such, the amount of air flowing through the grill 1100 may be adjusted by the control 1106 and/or the vent cover 1108. In some embodiments, the vent cover 1108 and/or the control 1106 may be moved (e.g. rotated, etc.) to substantially close the vent openings (e.g., a closed vent position), substantially open the vent openings (e.g., an open vent position), etc.

For example, when the removable charcoal unit 600 (or another suitable removable charcoal unit) is employed as shown in FIG. 11A, the vent cover 1108 and/or the control 1106 may be adjusted as desired based on temperature, the type of food in the grill, etc. In other embodiments, the vent cover 1108 and/or the control 1106 may be moved such that the vent openings are in the open vent position to allow more air to flow through the grill 1100 compared to, for example, the closed vent position. This may be done when a removable gas unit (as disclosed herein) is inserted into the grill 1100.

One or more components of the grills disclosed herein may be formed of any suitable material. For example, the burners disclosed herein may include steel (e.g., stainless steel), cast iron and/or another suitable material. Other components of the removable units such as portions of the gas port systems, gas control systems, ignition systems, etc. may include steel, plastic, and/or another suitable material. Some components of the grills such as the vessels, the fire bowls, and/or the lids disclosed herein may include one or more earthen materials such as clay, ceramics, etc. Other components of the grills such as the base supports, vents, etc. disclosed herein may include steel, plastic and/or another suitable material.

Gaseous fuel as disclosed herein may include any suitable combustible gas, a combination of combustible gases, a combination of combustible gases and noncombustible gases, etc. For example, the gaseous fuel may include natural gas, propane and/or another suitable gas. The gaseous fuel may be provided via a refillable tank (e.g., a propane tank), a gas line from a house gas system, etc.

Additionally, the charcoal disclosed herein may include any suitable material. For example, the charcoal may include lump charcoal, charcoal briquettes, wood, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A grill assembly comprising:
a vessel comprising an upper shell, a lower shell, and a vent in the upper shell, the upper and lower shells forming a cooking chamber, the vessel further defining an opening in a wall of the lower shell and extending between an interior of the vessel and an exterior of the vessel;
a fire bowl comprising a side wall and a floor, the fire bowl being adapted to be positioned within the vessel spaced inwardly from the lower shell and supported above a bottom surface of the lower shell, and the floor of the fire bowl defining an opening there-through, wherein the vent of the vessel is positioned vertically above the opening in the floor of the fire bowl when the vessel is closed; and
a first removable unit comprising a gas burner and one or more vents for allowing air to flow into the first removable unit, the first removable unit being adapted to be inserted through the opening in the wall of the lower shell so that the gas burner is within the vessel and below a cooking surface and the opening in the floor of the fire bowl,
wherein the gas burner is adapted to operate using a gaseous fuel when the first removable unit is inserted in the opening in the vessel.

2. The grill assembly of claim 1 further comprising a support for the fire bowl, the support being positioned between a lower portion of the fire bowl and the bottom surface of the lower shell.

3. The grill assembly of claim 1 wherein the first removable unit includes an ignition system configured to ignite the gaseous fuel supplied to the gas burner.

4. The grill assembly of claim 3 wherein the ignition system includes an automatic igniter.

5. The grill assembly of claim 1 wherein the first removable unit includes a gas port adapted to make a connection to a source of the gaseous fuel.

6. The grill assembly of claim 1 wherein the first removable unit includes a gas control system coupled to the gas burner for controlling an amount of the gaseous fuel received by the gas burner.

7. The grill assembly of claim 1 wherein the gas burner includes an infrared burner.

8. The grill assembly of claim 1 wherein the gas burner is aligned with the opening in the fire bowl.

9. The grill assembly of claim 8 further comprising a flame barrier positioned in the fire bowl.

10. The grill assembly of claim 1 wherein the vessel is formed from an earthen material.

11. The grill assembly of claim 1 wherein the first removable unit further comprises a housing including a faceplate adapted to substantially cover the opening in the vessel and including one or more openings in the faceplate for allowing air to pass into or out of the grill assembly.

12. The grill assembly of claim 1 wherein the cooking surface comprises a grate for supporting food.

13. The grill assembly of claim 1 wherein the first removable unit is adapted to slide into and out of the vessel without structural modifications to the grill assembly.

14. The grill assembly of claim 1 further comprising a second removable unit being adapted to be inserted through the opening in the wall of the lower shell when the first removable unit is removed from the vessel, and wherein the gas burner is adapted to operate using a non-gaseous fuel when the second removable unit is inserted in the opening in the lower shell.

15. The grill assembly of claim 14 wherein the second removable unit further comprises a receptacle adapted to be positioned below the opening in the fire bowl for collecting ashes passing through the opening in the fire bowl from charcoal burned in the fire bowl.

16. The grill assembly of claim 15 further comprising an attachment interface coupled to the vessel adjacent the opening in the vessel, the attachment interface configured to receive the first removable unit or the second removable unit when the first removable unit or the second removable unit is inserted in the opening in the lower shell.

17. The grill assembly of claim 16 further comprising one or more locking devices for securing the first removable unit to the attachment interface when the first removable unit is inserted in the opening in the lower shell.

18. The grill assembly of claim 15 wherein an outer surface of the second removable unit defines at least one opening for providing airflow into the vessel.

19. The grill assembly of claim 18 wherein the vessel comprises a vent positioned vertically above the opening in the floor of the fire bowl when the vessel is closed.

20. The grill assembly of claim 18 wherein the second removable unit further comprises a vent system, the vent system comprising:
   a vent opening; and
   a vent cover movable between an open position, a closed position and other intermediate positions;
   wherein the vent system allows for ambient air to pass through the vent opening and along the second removable unit before entering the fire bowl.

21. The grill assembly of claim 20 wherein the vent system comprises rotatable vent covers.

22. The grill assembly of claim 20 wherein the vent system comprises slidable vent covers.

23. The grill assembly of claim 20 wherein the vent system is configured with numeric indicators.

24. The grill assembly of claim 18 further comprising a support for the fire bowl, the support being positioned between a lower portion of the fire bowl and the bottom surface of the lower shell.

25. The grill assembly of claim 14 wherein the second removable unit is adapted to slide into and out of the vessel without structural modifications to the grill assembly.

26. The grill assembly of claim 14 wherein the non-gaseous fuel comprises charcoal or wood.

27. The grill assembly of claim 14 wherein the vessel further comprises a surface for receiving the second removable unit which abuts a surface of the second removable unit when the second removable unit is in a closed position.

28. The grill assembly of claim 27 wherein the surface for receiving the second removable unit and the surface of the second removable unit are planar.

29. The grill assembly of claim 14 wherein an outer surface of the second removable unit defines at least one opening for providing airflow into the vessel.

30. The grill assembly of claim 29 wherein the at least one opening is a portion of a screen, or the at least one opening is beneath a vent cover that is movable between an open position, a closed position and other intermediate positions to cover or expose at least one portion of the at least one opening.

31. The grill assembly of claim 14 wherein the second removable unit comprises an external grip for slidably removing the second removable unit from the grill assembly.

32. The grill assembly of claim 1 wherein the vessel comprises a protrusion defining the opening in the vessel for receiving the first removable unit.

* * * * *